Aug. 27, 1968  R. S. SPROULE  3,398,696
ROTARY HYDRAULIC MACHINES
Filed June 6, 1966  3 Sheets-Sheet 1

ROBERT STANLEY SPROULE
INVENTOR.

BY T. O. Eckersley

ROBERT STANLEY SPROULE
INVENTOR.

BY R O Eckersley

United States Patent Office 3,398,696
Patented Aug. 27, 1968

3,398,696
ROTARY HYDRAULIC MACHINES
Robert S. Sproule, Montreal, Quebec, Canada, assignor to Dominion Engineering Works, Limited, Lachine, Quebec, Canada, a corporation of Canada
Filed June 6, 1966, Ser. No. 555,582
2 Claims. (Cl. 103—103)

ABSTRACT OF THE DISCLOSURE

The shroud space of a turbomachine such as a Francis turbine has sealing liquid containing a drag reducing additive such as poly(ethylene-oxide) introduced therein. The shroud space may be aerated, in which case the liquid with additive is restricted to one or more sealing zones bounding the aerated shroud space adjacent the shroud edges.

---

This invention is directed to an improved rotary hydraulic machine such as a turbine, pump or pump-turbine, and in particular is directed to hydraulic machines employing shrouded runners and utilizing drag reducing additive within annular zones external to the runner.

In the past considerable effort has been directed to means for improving the efficiency of hydraulic rotary machines employing shrouded runners by attempting to reduce the friction drag exerted against the outer wetted surfaces of the runner shrouds. Previous efforts have been directed to steps such as the introduction of air to annular zones in contact with these outer shroud surfaces in order to reduce the wetted surface area, the drag in a working liquid such as water being very much greater than the drag in a fluid such as air. In order to make efficient use of air to reduce drag, it is necessary to effect sealing of the aerated shroud space, usually by the establishment and maintenance of a stable rotating water sealing ring, in order to prevent excessive losses of the air or other gas used. Such seals must have substantial radial width in order to be effective in preventing air loss, and such seals themselves present a substantial wetted surface which produces significant fluid friction drag upon the runner of the machine.

An object of the present invention is to provide a rotary hydraulic machine capable of operating with improved efficiency, due to reduced drag losses.

It has been found that the fluid drag of water against a wetted surface can be effectively reduced by the addition of a drag reducing additive to the water, at appropriate concentrations. One such useful drag reducing additive is poly(ethylene-oxide) known as "Polyox," the trademark of Union Carbide, which, at a concentration of about 30 parts per million effectively reduces the drag of the water on a wetted surface over a range of Reynolds number. The present invention provides turbine structures particularly suited for utilizing this property.

In installations where shroud space aeration is not utilized, the benefits of the present invention can be obtained by adding the drag reducing additive to the liquid in the liquid-filled shroud space. The additive can also be utilized in the seals bounding the shroud space. In order to conserve the drag reducing additive, a circulatory circuit is provided in liquid-containing seal structure located within or adjacent to the shroud space, in which the seal liquid is returned from the low pressure end of the seal by means of a pump operating in an external flow circuit to the high or pressure portion of the seal.

This closed circuit seal circulation may also be utilized with a machine having an aerated shroud space, in which the high pressure portion of the seal forms a boundary to the aeration space. These closed circuit seal circulation systems may also include supply means for introducing drag reducing additive to the closed seal circuit, the additive generally being introduced in the form of a pre-prepared liquid.

The present invention also contemplates the utilization of controlled leakage of drag-reducing liquid from the shroud space, such as over the high pressure lip of the shroud, to provide flow of the drag-reducing additive over the inner wetted surface of the shroud member wetted by the main flow of working fluid, whereby drag on working fluid through the machine is also reduced.

The present invention thus provides means for introducing drag-reducing additive to the liquid in contact with the outer surface of a shroud, together with means for preventing the additive from being quickly washed away from the additive zone.

It will be understood that the present invention wherein controlled leakage is permitted from an edge of the shroud of the machine may be utilized at the low pressure edge of the shroud in the case of a pump, as well as the high pressure edge of the shroud in the case of a turbine.

What has been provided in a rotary hydraulic machine such as a pump, turbine or pump-turbine having a housing with a main inlet and outlet for working fluid, a shrouded runner rotatably mounted within the housing having blade members with at least one annular shroud means attached thereto, the shroud means being bounded by a high pressure edge, and a low pressure edge, the blade members defining flow paths for working fluid between the housing inlet and outlet, an annular clearance zone located between the shroud means and the adjacent portion of the housing in facing relation therewith, bounded by the high and low pressure edges, fluid sealing means to restrict flow through the annular clearance zone located therein, is the improvement comprising; means to introduce to at least one selected portion of the annular clearance zone liquid having a drag reducing substance therein whereby the drag of liquid on an annular wetted surface of the zone is effectively reduced. The invention thus provides control means whereby the leakage of liquid containing drag reducing additive is controlled.

The following is a description by way of example of certain embodiments of the present invention, reference being had to the accompanying drawings in which.

Figure 1:
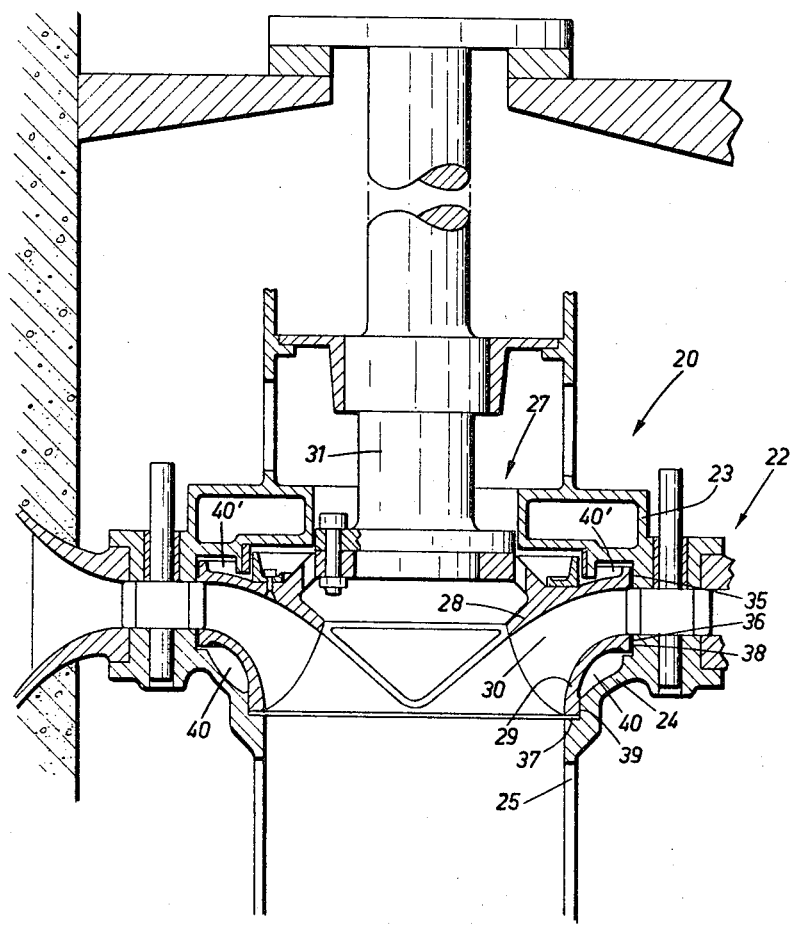
FIGURE 1 is a section view of a Francis turbine showing the general structural details of the machine.

Referring to FIGURE 1, the Francis turbine 20 illustrated, which is typical also of centrifugal pump structures, comprises a stationary housing 22 having a runner 27 rotatably mounted therein and secured to a power shaft 31.

The stationary housing 22 includes a top half 23, and a bottom half 24 mounted upon a draft tube 25.

The runner 27 includes an annular upper shroud 28, an annular lower shroud 29, and blades 30 secured therebetween and defining a flow path for working fluid extending through the runner.

The upper and lower shrouds 28 and 29 are of circular plan form, having radially outer high pressure shroud edges 35, 36, respectively. The lower shroud 29 also has a low pressure edge 37 at a lesser radius from the center of rotation of the machine than the high pressure edge 36.

Running clearances between the runner 27 and the stationary housing 22 provide an annular clearance zone 38 at the high pressure edge 36 of the lower shroud 29, and a clearance zone 39 at the radially inner edge of the lower shroud 29 and defining therebetween a lower annular shroud space 40. 40' is a similar upper annular shroud space.

Figure 2:
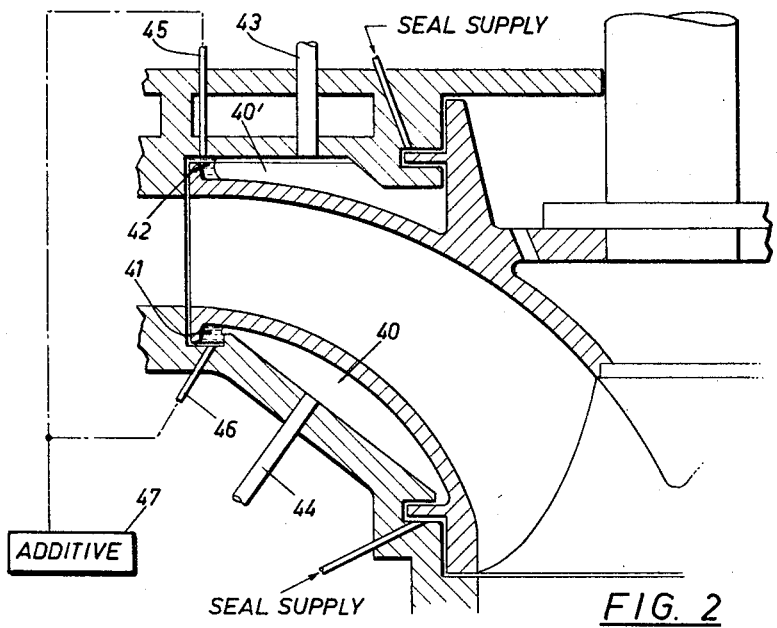
FIGURE 2 is a partial section view of a machine of Francis type having aerated shroud spaces the present invention being embodied adjacent the shroud high pressure edge.

Referring to FIGURE 2, this shows a machine having peripheral sealing water rings 41, 42 for the lower and upper shrouds 29, 28 at the respective high pressure edges to retain air provided through supply conduits 43, 44 for the upper and lower shroud spaces 40, 40' respectively. Conduit means 45, 46 connecting with the peripheral water rings 42, 41 respectively supply friction-reducing additive thereto from an additive supply source 47.

The illustrated form of high pressure shroud tip shows an axially extending seal-energizing runner flange portion.

Typical of the additive suited for this use are some of the high molecular weight polymers such as one of the high molecular weight poly(ethylene-oxides), in concentrations in the order of 30 parts polymer per 1,000,000 parts water.

It will be seen, with refeernce to the embodiments illustrated in FIGURE 2 that high pressure sealing fluid lost from the peripheral watering 41 by turbulence outwardly into the main working fluid, may produce a reduction in friction losses within the diffuser, when flowing outwardly in the case of a pump, and may correspondingly result in the reduction in friction losses when flowing inwardly over the shroud inner wetted surfaces in the case of a turbine.

Figure 3:
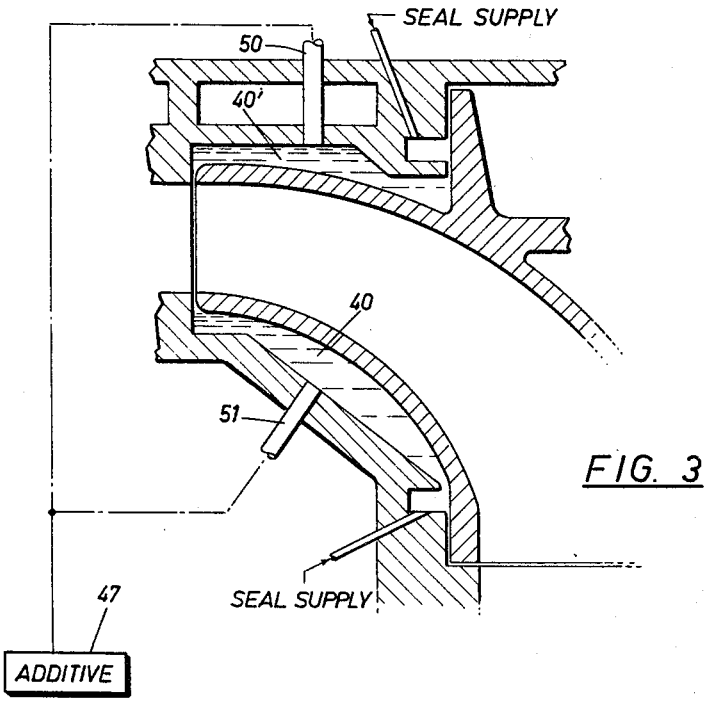
FIGURE 3 is a partial sectional view of a machine of the Francis type having nonaerated shroud spaces embodying the present invention.

Referring to the embodiment illustrated in FIGURE 3, this shows a machine such as a turbine or pump wherein the annular spaces 40, 40' are filled with fluid such as water, being generally the working fluid of the machine. The conduits 50, 51 supply additive to these annular spaces from an additive source 47, whereby the frictional drag produced by the liquid within the annular spaces 40, 40' is reduced in accordance with the effectiveness of the additive employed.

Supply of sealing water to the space adjacent the shrouds' low pressure edges respectively, shown in FIGURE 3, substantially prevents the loss of additive from the upper and lower annular spaces, past the low pressure edges of the shrouds.

Figure 4:
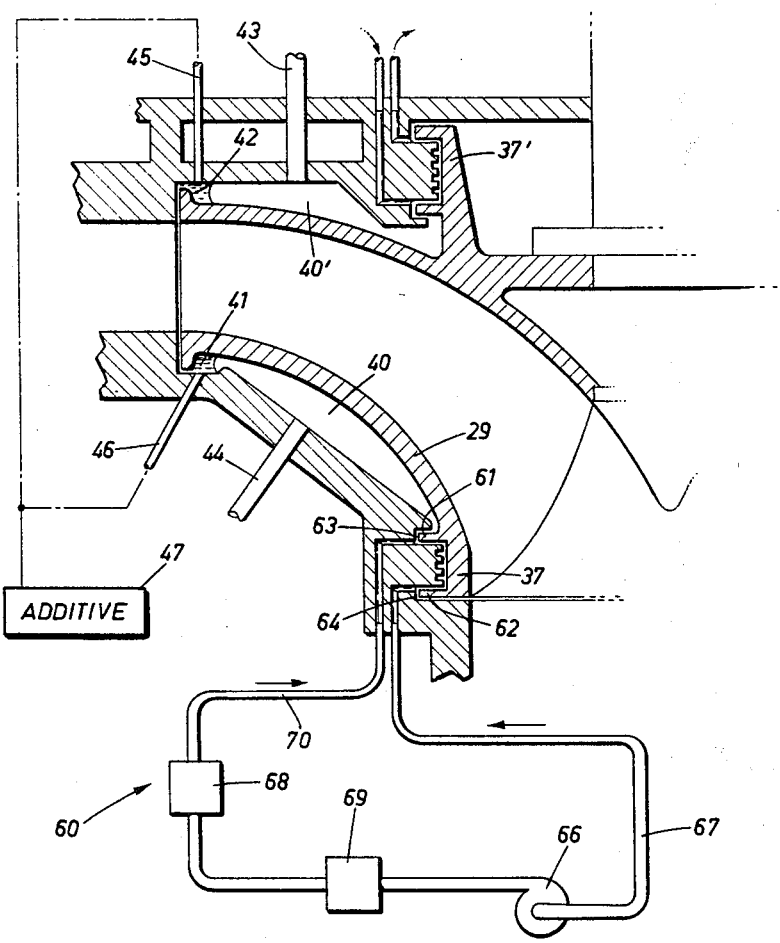
FIGURE 4 is a partial sectional view of a machine of the Francis type embodying a further arrangement of the present invention including a recirculation circuit, which may be used also in conjunction with the supply of additive to a fully wetted shroud.

Referring to the embodiment illustrated in FIGURE 4 the low pressure portions of the upper and lower shrouds 37', 37 are effectively sealed against air loss from the annular spaces 40, 40' each by way of a labyrinth seal, illustrated as having annular baffle rib portions 61, 62 shown extending radially outwardly into fluid sealing relation with seal pockets 63, 64, the seal containing liquid of low drag characteristic employing friction reducing additive previously disclosed. Conduits 67, 70 connect the low pressure side 64 of the seal to the high pressure side 63 by way of a circuit including a pump 66, pressure control system 68 and additive control means 69, to minimize loss of the additive.

The inlet pressure to the conduit 67 is that of the lowest seal pressure, at 64, and the outlet pressure in conduit 70 provided by the pump 66 is set slightly higher than the highest seal pressure at 63 so that the sealing liquid is collected and recirculated through the pump and other elements of the control system whereby the sealing liquid is maintained within the seal, and the concentration of friction reducing additive within the seal can be controlled.

It will be understood that optimum effectiveness of the disclosed apparatus can be achieved by maintaining the working concentration of the friction reducing additive at an optimum value.

It will be further understood that additional combinations of the previously described arrangements can be effected. Thus the use of the recirculation system illustrated in FIGURE 4, in combination with a fully flooded shroud space may be readily practiced. It will be further understood that in a fully flooded shroud space containing drag reducing additive, the pressurized seal arrangement of FIGURE 4 may or may not include additive therein at the full concentration.

While the foregoing has been disclosed with reference to machines in which the working fluid is water, it will be understood that the invention is susceptible of use with alternative fluids such as oil, in which such instance, sealing water is introduced into the shroud space to exclude the more viscous working fluid therefrom.

What I claim as new and desire to secure by Letters Patent of the United States is:

1. In a turbomachine having a housing with a main inlet and a main outlet for fluid being handled by the machine, a shrouded runner rotatably mounted in the housing, the runner having blade members with at least one annular shroud means attached thereto, said blades and shroud forming a plurality of flow paths for the fluid between said inlet and said outlet, said shroud and said housing defining an annular clearance zone therebetween, said zone being bounded at one end by the high pressure edge of said shroud and at the other end by an annular shroud edge portion, means for supplying pressurized air to said annular space, an annular liquid containing seal located in said clearance zone having a high pressure end portion and a low pressure end portion, liquid pumping means connecting said low pressure portion of the seal with said high pressure portion, and means to increase the concentration of a drag reducing additive to said seal liquid within said seal, whereby the drag of a wetted surface portion of said shroud on rotation thereof is effectively reduced.

2. A hydraulic turbomachine such as a pump, turbine or pump-turbine having a housing with a main inlet and a main outlet for working fluid, a shrouded runner rotatably mounted within said housing having blade members with at least one annular shroud means attached thereto defining a plurality of main flow paths for working fluid between said inlet and said outlet, an annular shroud clearance zone lying between said housing and the face of said shroud means remote from said blades bounded by a high pressure shroud edge and a low pressure edge, and at least one annular liquid containing seal within said clearance zone to restrict flow of fluid therethrough, means to introduce to at least one selected portion of said clearance zone fluid in liquid phase together with drag reducing additive in solution therein to modify the drag of the liquid, means to increase the concentration of additive within at least a portion of the zone, means to control said concentration increasing means, additive monitoring means to monitor the effective concentration of additive in said liquid, and means connecting said monitoring means with said control means whereby in operation the drag of said liquid on the respective wetted moving surface of the zone is effectively reduced.

References Cited

UNITED STATES PATENTS

| | | |
|---|---|---|
| 3,286,674 | 11/1966 | Thompson et al. _____ 114—67.1 |
| 3,290,883 | 12/1966 | Giles et al. _____ 253—117 |
| 1,823,702 | 9/1931 | Ring _____ 253—117 |
| 3,081,975 | 3/1963 | Sproule et al. _____ 253—26 |
| 3,174,719 | 3/1965 | Sproule et al. _____ 103—111 |
| 3,236,499 | 2/1966 | Chatfield et al. _____ 103—111 |
| 3,239,193 | 3/1966 | Kerensky _____ 103—111 |
| 3,245,656 | 4/1966 | Desbaillets et al. _____ 253—26 |
| 3,253,816 | 5/1966 | Sproule _____ 253—26 |

FOREIGN PATENTS

| | | |
|---|---|---|
| 592,528 | 2/1934 | Germany. |
| 216,493 | 8/1941 | Switzerland. |

HENRY F. RADUAZO, *Primary Examiner.*